(12) United States Patent
Downey et al.

(10) Patent No.: US 8,087,068 B1
(45) Date of Patent: Dec. 27, 2011

(54) VERIFYING ACCESS TO A NETWORK ACCOUNT OVER MULTIPLE USER COMMUNICATION PORTALS BASED ON SECURITY CRITERIA

(75) Inventors: Brandon A. Downey, Mountain View, CA (US); Amit J. Patel, Mountain View, CA (US); Chris Yu, San Jose, CA (US)

(73) Assignee: Google Inc., Mountain View, CA (US)

( * ) Notice: Subject to any disclaimer, the term of this patent is extended or adjusted under 35 U.S.C. 154(b) by 1086 days.

(21) Appl. No.: 11/074,007

(22) Filed: Mar. 8, 2005

(51) Int. Cl.
G06F 21/00 (2006.01)
H04L 29/06 (2006.01)

(52) U.S. Cl. ............................................. 726/4; 726/5
(58) Field of Classification Search ........................ 726/4
See application file for complete search history.

(56) References Cited

U.S. PATENT DOCUMENTS

| | | |
|---|---|---|
| 5,541,977 A | 7/1996 | Hodges et al. ................. 379/58 |
| 5,636,346 A | 6/1997 | Saxe |
| 5,724,521 A | 3/1998 | Dedrick et al. |
| 5,845,265 A | 12/1998 | Woolston |
| 5,918,010 A | 6/1999 | Appleman et al. |
| 5,920,854 A | 7/1999 | Kirsch et al. |
| 5,931,901 A | 8/1999 | Wolfe et al. |
| 5,974,398 A | 10/1999 | Hanson et al. |
| 6,026,368 A | 2/2000 | Brown et al. |
| 6,044,375 A | 3/2000 | Shmueli et al. |
| 6,061,659 A | 5/2000 | Murray |
| 6,067,570 A | 5/2000 | Kreynin et al. |
| 6,078,866 A | 6/2000 | Buck et al. |
| 6,161,130 A | 12/2000 | Horvitz et al. ................. 709/206 |
| 6,195,698 B1 | 2/2001 | Lillibridge et al. ........... 709/225 |
| 6,199,102 B1 | 3/2001 | Cobb ........................... 709/206 |
| 6,223,163 B1 | 4/2001 | Van Luchene |
| 6,230,170 B1 | 5/2001 | Zellweger et al. |
| 6,247,009 B1 | 6/2001 | Shiiyama et al. |
| 6,253,189 B1 | 6/2001 | Feezell et al. |
| 6,269,361 B1 | 7/2001 | Davis et al. |
| 6,285,987 B1 | 9/2001 | Roth et al. |

(Continued)

FOREIGN PATENT DOCUMENTS

EP 1026610 A2 8/2000

(Continued)

OTHER PUBLICATIONS

Visualtron, "MobileKey TM (Mobile Authentication Server)", retrieved from the internet on Sep. 19, 2008, URL: http://web.archive.org/web/20030628084645/http://visualtron.com/products_mobilekey.htm. publishing date Jun. 28, 2003.*

(Continued)

*Primary Examiner* — Benjamin Lanier
*Assistant Examiner* — Devin Almeida
(74) *Attorney, Agent, or Firm* — Morgan, Lewis & Bockius LLP

(57) ABSTRACT

A computer-implemented system and method for verifying access to a network account are provided. A first user communication portal is associated with a user network account. A request to access the user network account is received from a second user communication portal. Security criteria related to the second user communication portal is determined. Access to the user network account is enabled upon receipt of a communication associated with the first user communication portal when the security criteria is of a predetermined value.

40 Claims, 5 Drawing Sheets

U.S. PATENT DOCUMENTS

| | | | |
|---|---|---|---|
| 6,298,348 B1 | 10/2001 | Eldering | |
| 6,324,519 B1 | 11/2001 | Eldering | |
| 6,336,132 B2 | 1/2002 | Appleman et al. | |
| 6,421,675 B1 | 7/2002 | Ryan et al. | |
| 6,871,063 B1* | 3/2005 | Schiffer | 455/410 |
| 6,907,239 B1 | 6/2005 | Sivula | 455/406 |
| 6,934,838 B1 | 8/2005 | Boyce et al. | 713/156 |
| 7,139,740 B2 | 11/2006 | Ayala | 706/26 |
| 7,254,705 B2 | 8/2007 | Yokota et al. | 713/155 |
| 7,606,918 B2 | 10/2009 | Holzman et al. | 709/229 |
| 2001/0042064 A1 | 11/2001 | Davis et al. | |
| 2001/0047297 A1 | 11/2001 | Wen | |
| 2001/0051911 A1 | 12/2001 | Marks et al. | |
| 2001/0053685 A1 | 12/2001 | Mori et al. | 455/411 |
| 2002/0002509 A1 | 1/2002 | Wagorn et al. | |
| 2002/0002525 A1 | 1/2002 | Arai et al. | |
| 2002/0026359 A1 | 2/2002 | Long et al. | |
| 2002/0035536 A1 | 3/2002 | Gellman | |
| 2002/0038282 A1 | 3/2002 | Montgomery | |
| 2002/0046099 A1 | 4/2002 | Frengut et al. | |
| 2002/0046104 A1 | 4/2002 | Kaddeche et al. | |
| 2002/0077891 A1 | 6/2002 | Castle et al. | |
| 2002/0099605 A1 | 7/2002 | Weitzman et al. | |
| 2002/0111898 A1 | 8/2002 | Numaoka et al. | |
| 2002/0123988 A1 | 9/2002 | Dean et al. | |
| 2002/0165773 A1 | 11/2002 | Natsuno et al. | |
| 2002/0184097 A1 | 12/2002 | Hijiri et al. | |
| 2002/0194062 A1 | 12/2002 | Linide | |
| 2002/0198780 A1 | 12/2002 | Kawakami et al. | |
| 2003/0037334 A1 | 2/2003 | Khoo et al. | |
| 2003/0070167 A1 | 4/2003 | Holtz et al. | |
| 2003/0083937 A1 | 5/2003 | Hasegawa et al. | |
| 2003/0149618 A1 | 8/2003 | Sender et al. | |
| 2003/0163372 A1 | 8/2003 | Kolsy | |
| 2003/0172272 A1 | 9/2003 | Ehlers et al. | 713/170 |
| 2003/0216963 A1 | 11/2003 | Ishiwaka et al. | |
| 2004/0003084 A1* | 1/2004 | Malik et al. | 709/225 |
| 2004/0003283 A1 | 1/2004 | Goodman et al. | 713/201 |
| 2004/0015397 A1 | 1/2004 | Barry et al. | |
| 2004/0019523 A1 | 1/2004 | Barry et al. | |
| 2004/0044571 A1 | 3/2004 | Bronnimann et al. | |
| 2004/0054577 A1 | 3/2004 | Inoue et al. | |
| 2004/0054589 A1 | 3/2004 | Nicholas et al. | |
| 2004/0059708 A1 | 3/2004 | Dean et al. | |
| 2004/0059712 A1 | 3/2004 | Dean et al. | |
| 2004/0093327 A1 | 5/2004 | Anderson et al. | |
| 2004/0093620 A1 | 5/2004 | Iino et al. | |
| 2004/0119740 A1 | 6/2004 | Chang et al. | |
| 2004/0143499 A1 | 7/2004 | Dietsch et al. | |
| 2004/0143843 A1 | 7/2004 | Khoo et al. | |
| 2004/0167928 A1 | 8/2004 | Anderson et al. | |
| 2004/0177110 A1 | 9/2004 | Rounthwaite et al. | 709/202 |
| 2004/0199597 A1 | 10/2004 | Libbey et al. | 709/207 |
| 2004/0249709 A1 | 12/2004 | Donovan et al. | |
| 2005/0021649 A1 | 1/2005 | Goodman et al. | 709/207 |
| 2005/0044154 A1 | 2/2005 | Kaminski et al. | 709/206 |
| 2005/0044155 A1 | 2/2005 | Kaminski et al. | 709/206 |
| 2005/0065806 A1 | 3/2005 | Harik | |
| 2005/0071224 A1 | 3/2005 | Fikes et al. | |
| 2005/0096979 A1 | 5/2005 | Koningstein | |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0204005 A1 | 9/2005 | Purcell et al. | 709/206 |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0223002 A1 | 10/2005 | Agarwal et al. | |
| 2005/0229251 A1 | 10/2005 | Chellapilla et al. | 726/23 |
| 2005/0262210 A1 | 11/2005 | Yu | 709/206 |
| 2005/0287984 A1 | 12/2005 | St. Clair | 455/406 |
| 2006/0107316 A1 | 5/2006 | Fiske | 726/18 |
| 2006/0154661 A1 | 7/2006 | Gonen et al. | 455/435.1 |
| 2006/0195604 A1 | 8/2006 | Goodman et al. | 709/232 |
| 2006/0286530 A1 | 12/2006 | Forrest et al. | 434/323 |

FOREIGN PATENT DOCUMENTS

| | | |
|---|---|---|
| WO | WO 0038074 | 6/2000 |
| WO | WO 2004/042525 | 5/2004 |

OTHER PUBLICATIONS

Paul Roberts, "AOL, RSA, VeriSign Push Authentication Services", IDG News Service, retrieved from the internet on Dec. 22, 2005, URL:< http://www.networkworld.com/news/2004/0921aolrsa.html, Sep. 21, 2004.

Paul Roberts, "AOL, RSA, VeriSign Push Authentication Services: VeriSign's Program Focuses on Multifactor Authentication", IDG News Service, retrieved from the internet on Dec. 22, 2005, URL:< http://www.computerworld.com/printthis/2004/0,4814,96066,00.html, Sep. 21, 2004.

Secure Computing, "Securing Connections between People, Applications and Networks™", retrieved from the internet on Dec. 22, 2005, URL:< http://www.securecomputing.com.

Secure Computing, "The MobilePass® Solution: Zero-Footprint Authentication through Text Messaging", retrieved from the internet on Dec. 22, 2005, URL:< http://www.securecomputing.com/index.cfm?skey=1155.

Finextrax, "ASB Bank Authenticates Internet Users VIA SMS", retrieved from the internet on Dec. 22, 2005, URL:< http://www.finextra.com/fullstory.asp?pf=y&id=9196.

Visualtron, "MobileKey™ (Mobile Authentication Server): 2-Factor Authentication- What is MobileKey?", retrieved from the internet on Dec. 22, 2005, URL:< http://www.visualtron.com/products_mobilekey.htm.

Chris Sherman, "Google Launches AdWords Select," Feb. 20, 2002, 6 pages.

Google Introduces New Pricing For Popular Self-Service Online Advertising Program, http://www.google.com/press/pressrel/select.html, p. 1-2, dated Feb. 20, 2002, printed on Jul. 27, 2003. (electronic copy on enclosed CD).

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

von Ahn et al., "Telling Humans and Computers Apart Automatically," Communications of the ACM, Feb. 2004, vol. 47, No. 2, pp. 57-60.

von Afin et al., "CAPTCHA: Using Hard AI Problems for Security," Computer Science Department, 2003, 18 pgs.

* cited by examiner

ACCOUNT PROFILE                                                                400 username:      johndoe1
password:      (not shown)

limited password (cannot edit account profile):     [not shown]
most limited password (view last 25 emails only):   let_me_in1 address:    123 Main Street
            Springfield, USA

SECURITY PREFERENCES:

Require Second Channel Verification in the following circumstances:

- X    More than 10 access attempts in one day
- ___    More than 5 access attempts in one day
- ___    More than 3 attempts from 2-5am in a single day
- X    Login from a computer with identified malware
- ___    Login from an IP address from any of the following countries:
    - X    Romania
    - X    Iraq
    - X    Nigeria
- ___    Download of more than 5 documents in one session
- X    Download of complete address list Second channel:
    Text messaging number: (202) 555-1234
Third channel:
    email address:  johndoe123@email.com
Fourth channel:
    fingerprint data at designated Account Terminal
Fifth channel: send one-time-use access code to another user:
    janedoeABC@email.com Enable Third Party Verification: NO One-time use passwords:     co2q34'l5
                            b084q3

User-created one-time use passwords:
                            johnny_limited1
                            johnny_limited2

FIG. 4

VERIFYING ACCESS TO A NETWORK ACCOUNT OVER MULTIPLE USER COMMUNICATION PORTALS BASED ON SECURITY CRITERIA

FIELD OF THE INVENTION

The present invention relates to a system and method for verifying access to a network account based on verification from multiple security portals.

BACKGROUND OF THE INVENTION

Many network accounts, including online financial accounts such as checking accounts, are protected only by a username and password login. Because most usernames—often an email address or variant of a person's name—are typically not secret, many of these accounts are as secure as the users' passwords. Thus, many users attempt to prevent account theft by using a password that is not written down anywhere, or at least by storing the password in a relatively safe location separate from storage of the username.

Nevertheless, network accounts still remain vulnerable to some forms of account theft and misappropriation. Passwords may occasionally be discovered by design or accident. For instance, hackers may gain access to an otherwise secure computer system and identify the keystrokes at a particular user terminal, including any username and password information entered at the terminal. Once a username and password are obtained without authorization, private account information may be compromised, and identities may be stolen.

Another problem with unauthorized access to network accounts is that, in contrast to the theft of physical items such as checkbooks and credit cards, the theft of (or the unauthorized access to) network account information is often undetectable. Account providers typically assume proper authorization if a user enters the correct password. Because access to an account may leave the account substantially or wholly undisturbed, the accountholder typically cannot detect if and when an account was accessed by another. Thus, while a traveler who loses a wallet may simply cancel credit cards, a victim of network account misappropriation is unlikely to discover the incursion and take remedial steps until it is too late.

Some security systems use strong authentication to verify account access and require multiple factors to identify users. For instance, some systems pass a one-time use password to a user's PDA, mobile phone, or email address at the time of login. Users may accordingly login to their accounts by providing their username, the passwords received at their mobile phones or other devices, and a memorized PIN. Unauthorized access in these systems require access to the user's mobile phone or PDA, in addition to the user's ID and private password. The additional security of these systems is achieved by an additional communication, often to an additional communication device. The additional step adds time and complication to the login process. Some users may access such accounts less often as a result. Furthermore, the additional step renders account access subject to the problems of communication networks and devices. For instance, a user may be unable to login to an account from a location where the user's mobile phone has no reception, and a traveling user may get locked out of an account once the user's PDA battery runs out of power.

These and other drawbacks exist with current systems and methods.

SUMMARY OF THE INVENTION

Accordingly, various embodiments of the present invention may be directed to a computer-implemented system and method for system and method for verifying access to a network account. A first user communication portal is associated with a user network account. A request to access the user network account is received from a second user communication portal. Security criteria related to the second user communication portal is determined. Access to the user network account is enabled upon receipt of a communication associated with the first user communication portal when the security criteria is of a predetermined value.

According to another embodiment, a system for verifying access to a network account is provided. An associating module associates a first user communication portal with a user network account. A request receiving module receives a request to access the user network account from a second user communication portal. A security determination module determines security criteria related to the second user communication portal. An account access module enables access to the user network account upon receipt of a communication associated with the first user communication portal when the security criteria is of a predetermined value.

According to another embodiment, a computer-implemented method for verifying access to a network account is provided. A user telecommunications number is associated with a user network account. A request to access the user network account is received from a computer. Security criteria related to the computer is determined, wherein the security criteria comprises information about at least one of the location of the computer and the presence of spyware or malware at the computer. Based on the security criteria, an account access code is passed via text message to the user telecommunications number. The account access code is received from the computer. Access to the user network account is enabled based on receiving the account access code, a username, and a password.

According to another embodiment, a system for verifying access to a network account is provided. An associating module associates a user telecommunications number with a user network account. A request receiving module receives a request to access the user network account from a computer. A security determination module determines security criteria related to the computer, wherein the security criteria comprises information about at least one of the location of the computer and the presence of spyware or malware at the computer. An access code module passes an account access code via text message to the user telecommunications number based on the security criteria. A login module receives the account access code from the computer. An account access module enables access to the user network account based on receiving the account access code, a username, and a password.

Other embodiments are also within the scope of the invention.

BRIEF DESCRIPTION OF THE DRAWINGS

FIG. 4 depicts an exemplary user settings interface according to an embodiment of the invention.

DETAILED DESCRIPTION OF EXEMPLARY EMBODIMENTS

Figure 1:
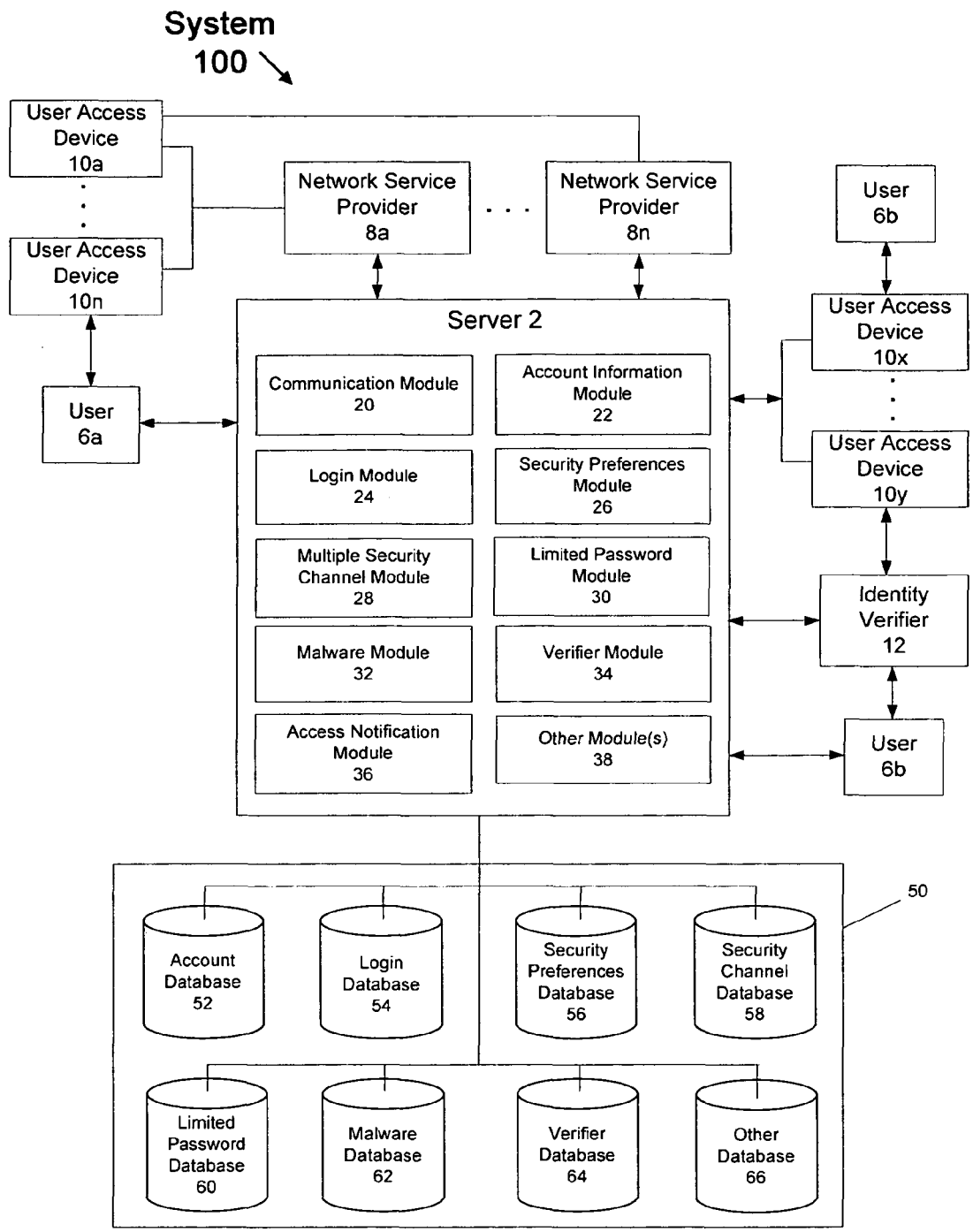
FIG. 1 depicts a system for verifying access to a network account according to an embodiment of the invention.

The embodiments described herein solve many problems with existing systems and methods. Using multiple user portals to verify the identity of a user makes unauthorized access to an account difficult or impossible. Even hackers with the most sophisticated programs and tools to hack into a user's computer cannot access a user account that requires multiple independent identity verification portals without also compromising the additional verification portals. Most hackers typically gain unauthorized access to only one account access portal of a given user, such as a user computer or computer network. Identifying and acquiring access to a second verification portal protected by separate security technology, passwords, and encrypted communication networks would require a different set of skills and resources that most hackers are unlikely to possess.

Thus, while an unauthorized person might happen upon a user's login ID, password, and credit card information, it is extremely unlikely that the same person will also acquire access to the user's cell phone and second password, for example. This additional level of protection is increased when the second portal requires a physical access medium such as a cell phone. It is unlikely that a hacker will leave the protection of anonymity in cyberspace to acquire physical access to a physical device, especially if the device is in a geographically distant location as is often the case. Also, access to (and theft of) a physical access device is much easier to detect so that remedial measures may be taken.

According to various embodiments of the invention, multiple verification portals may be used to enable user access to an account. For instance, in addition to providing a user name and password to access an email account, a user may also be prompted to send the account provider a confirmation (e.g., comprising a second password) from a second portal, such as the user's mobile phone before access is granted. The account provider may grant access to the account only after verifying information related to the second portal, including but not limited to the user name and password and the user's mobile phone number. In order for someone to acquire unauthorized access to the account, that person would need to acquire not only the accountholder's username and password, but also the user's mobile phone. While a hacker in Eastern Europe might acquire a California resident's username and password through a keystroke detector, it would be extremely difficult for the hacker to then acquire the same individual's mobile phone.

As used herein, the terms "account information," "account-related information," "document," and "electronic document" may encompass one or more content pages (e.g., web pages), emails, financial account information, applications, IM messages, audio content or files, video content or files, other files, other data or applications that may reside on one or several (e.g., a network) of computer systems, or other definable concepts or content that may be associated with an account or an account provider. The term "document" is sometimes used herein to refer to a single document associated with an account or account provider, such as a single email.

Overview and System Illustration

Figure 2:
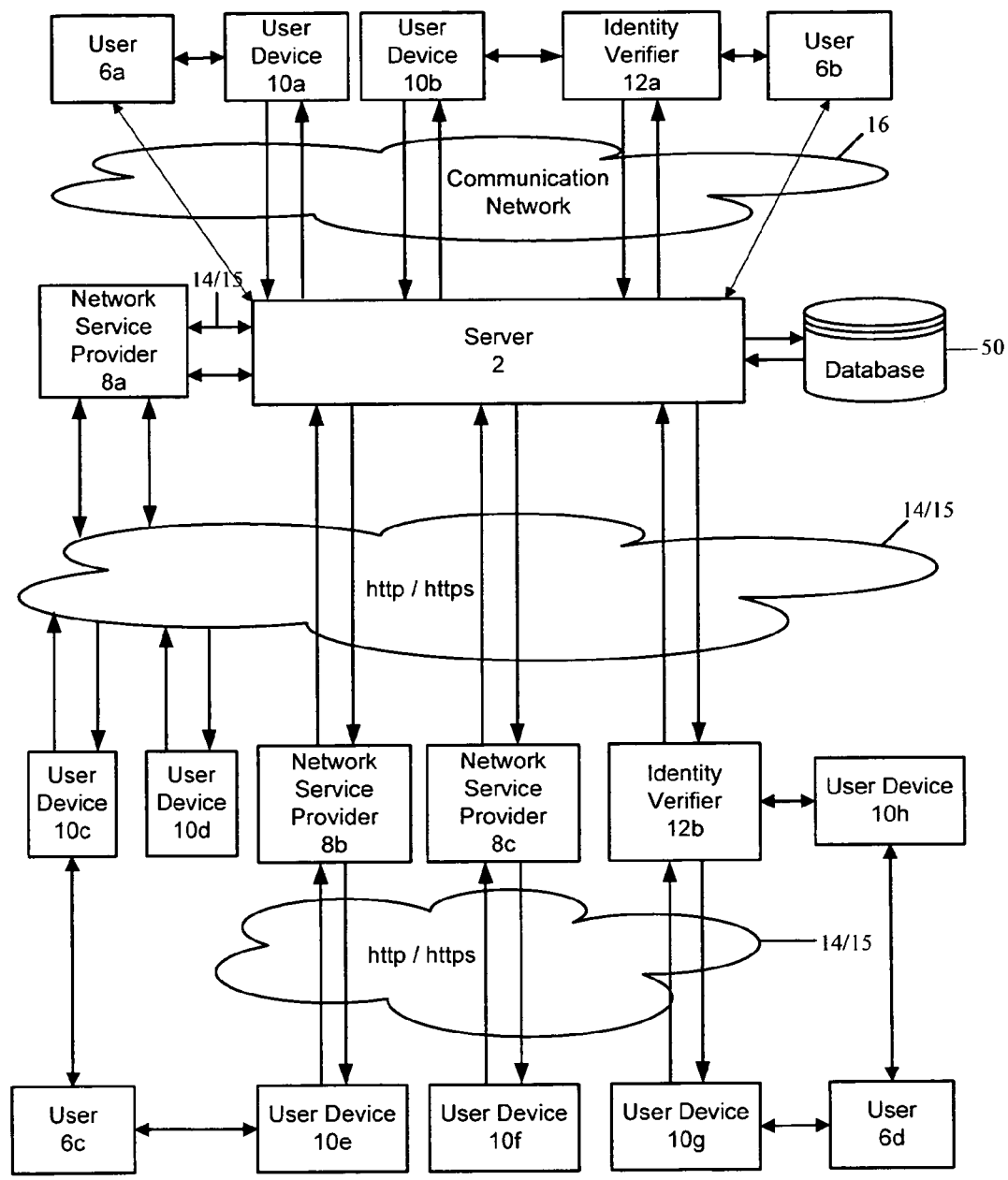
FIG. 2 depicts a networked environment for operation of a system for verifying access to a network account according to an embodiment of the invention.

FIGS. 1 and 2 depict an exemplary system 100 for verifying access to a network account according to an embodiment of the invention. The system may comprise: a server 2, one or more network service providers 8, one or more identity verifiers 12, one or more users 6, one or more user access devices 10, and one or more databases 50 operatively connected to server 2. Users 6 may obtain access to user network account information stored on a server 2 or communicate account security information via user access devices 10 and network service providers 8. Identity verifiers 12 may also authenticate the identity of a user 6 and communicate the authentication information to server 2 so that server 2 may grant a user 6 or device 10 access to the user's 6 account information. Server 2 may also communicate account access validation information directly with users 6.

As shown in FIG. 1, network service providers 8, user access devices 10, and identity verifiers 12 may communicate with one or more servers 2 via electronic communication, including Internet communications. Identity verifiers 12, providers 8, and access devices 10 may include or have access to one or more servers 2 for providing functionality associated with electronic documents. Information that may be communicated between and among server 2, network service providers 8, identity verifiers 12, and access devices 10 may include any one or more of the following: login information, identity information, security information, account information, and other content.

System 100 may enable server 2 to request, receive, and/or process network account-related information associated with a user 6 or user account. The server 2 may communicate account-related information such as account security and access information with network service providers 8, user access devices 10, and identity verifiers 12.

Network service providers 8 may provide account-related information to one or more access devices 10a-10n. Network service providers 8 may comprise any network service provider, search engine or other entity that makes available information, services, and/or products over an electronic network, such as the Internet. A network service provider 8 may include one or more of the following, for example: an advertisement listings provider, a network service provider, a website host, a server 2, any other entity that provides electronic documents to users 6 or other entities, or any other provider of accounts or account information. A provider 8 may also be an identity verifier 12.

User access devices 10 may be used by users 6 and other entities to communicate account-related information to server 2, providers 8, and identity verifiers 12. A user access device 10 may comprise any communication device or interface, such as a computer, PDA, phone, ATM, and any other communication interface that can be connected to a network. It should be noted that one user 6 may have more than one access device 10. For instance, users 6 may login to a network account at a computer 10a, verify a login attempt via text messaging on a user's wireless phone 10b, and then access the account on the same computer 10a or another computer 10c.

Account-related information received by server 2 may be communicated to and from user access devices 10 directly or indirectly via providers 8. Because user access devices 10 are typically used by their associated end users 6, they are sometimes referred to herein as "users". However, it should be noted that unauthorized persons may sometimes acquire access to a user's 6a access device 10a.

For instance, a network service provider 8 and/or user access device 10 may request account information. For instance, user 10 may submit login information such as a username and password to login to a network account associated with (e.g., stored on) the server 2. The server 2 may pass one or more account-related documents to the user device 10 (or provider 8) based on the login information. For instance, the server 2 may grant the user device 10 access to some or all of the information stored in the account or available information based on the account.

Identity verifiers 12 may comprise any person, processor, server, provider, or any other entity that may process security information and/or confirm or authenticate the identity of a user 6 or user device 10. For instance, identity verifier 12 may comprise a biometric reader that measures biological information of a user 6. For instance, identity verifier 12 may perform a retinal scan or process fingerprint information of a user 6. By comparing this information to stored information about the user 6 (such as stored fingerprints), an identity verifier 12 may determine the identity of a user 6. The identity verifier 12 may provide user identity authentication information to server 2. Server 2 may enable account access to a user device 10, e.g., based on identification/authentication information received from identity verifier 12 (or users 6 or user devices 10).

The server 2 may comprise any server, network account provider (e.g., email account provider), hub, central processor, provider, search engine, or other entity in a network. Although a single server 2 is depicted, it should be appreciated that multiple servers 2 may be provided and that such multiple servers may share data and operational tasks to achieve efficiency and operation of the functions described herein.

The server 2 may comprise one or more modules 20-36 to process security-related information (e.g., from a single user from multiple user devices 10), and other data.

Communication module 20 may communicate with users 6, service providers 8, user devices 10, and identity verifiers 12. For instance, communication module 20 may communicate account-related information with user devices 10 such as account setup information, account access information, and account content. For instance, communication module 20 may pass a request for login information to a user 10 and receive the user's 10 responsive login input. Communication module 20 may also communicate account verification information with identity verifiers 12.

Communication module 20 may also monitor the security of its communications. For instance, communication module 20 may determine if information is passed over an https network or an http network.

Account information module 22 may process account information associated with a user account. Account information may comprise any of the following types of information, for example: account setup information (including username, password, and personal information), user preferences and settings (including security preferences and account login settings), and account content such as emails, user address books, account notepads, user documents, account announcements and notifications, and any other information pertaining to a user account. Account information module 22 may store account information in account database 52.

Login module 24 may process account login information of a user account. Account login information may comprise any of the following, for example: user name, password, lost password information (such as a user-selected question and answer for remedying a lost password), security code information, and other account-related information. Login module 24 may coordinate the process of a user's attempt to login to a user account.

For instance, login module 24 may communicate with one or more access devices 10 and grant or deny partial or full access to an account. In some cases, login module 24 may enable access to an account upon verifying security information such as a username and password received from a user device 10, e.g., by comparing the security information to username and password information stored in login database 54. In other cases, access may be granted or denied based in part on the login information provided by a user and the user access device 10 from which it is received (or manner in which it is received).

Security preference module 26 may communicate security preference information with one or more user access devices 10. For instance, security preference module 26 may specify security settings associated with a user 6 account or enable the user 6 to specify security settings for the account. Security preference module 26 may store security preference information such as security settings in security preferences database 56. Security preferences may comprise settings and/or preferences that may govern a user's 6 or user device's 10 access to a network account. Security preferences may be established by the user, an administrator, a server 2, or other entity. Security preferences may be determined (e.g., by the user) during initial account setup. Security settings may also be added or changed during subsequent logins.

For instance, a security preference may provide that a message is sent to an access device 10 (e.g., a text message is sent to a user's 6 phone 10) any time an entity attempts to access the account.

Some security settings may cause the server 2 to implement enhanced account security features when specific account conditions arise. Security preference module 26 may determine when such conditions arise. Conditions that may cause enhanced security may comprise, for example: a specific time period; specific time of day, week, or month; predetermined time period; exceeding a certain threshold of successful logins or login durations during a predetermined period of time, such as five successful logins in a single 24-hour period; exceeding a threshold of login attempts (e.g., in a specific period of time or during a specific time of day or week) or failed login attempts; receiving a login request from an unsecure network access point (e.g., from a computer that was not previously certified or that is attempting access over a network deemed to be unsecure by the security preference module 26); receiving a login ID, password, or other identifier associated with enhanced security access of the account; receiving a request to use enhanced security measures (such as by verifying a user's identity via text message on a user's mobile phone); or other circumstances or conditions, such as other unusual account activity (e.g., as determined by server 2). Combinations of conditions may also cause certain security settings to be triggered.

It should be understood that any security features described herein may be regular or default security features, or they may be selectable security enhancements. For instance, a user 6 may request to turn on a particular security feature at any time or cause certain security features to be implemented only in certain circumstances.

One form of enhanced security may involve granting limited access to account information or functionality. For instance, under certain conditions, a user 6 may have limited access to email. The user may have access to only a certain number of emails. In some embodiments, the user 6 or user device 10 may access (or may be prohibited from accessing)

emails from specific entities, or emails that have a security status identified by the server 2 or associated with user-defined criteria (e.g., emails marked important, emails from a priority sender, emails located in a specific folder, or emails containing a certain words, attachments, or images.

Similar limitations may be placed on other content stored in the network account, such as addresses, personal notes, document folders, account settings, security preferences, and other information stored in the account. For instance, a user device 10 may only view the phone numbers of contacts instead of the address and other detailed contact information stored in an online address book in the account.

Under certain security conditions, the user device 10 may also have limited administrative rights. For instance, the device 10 may have read-only access to account information, or the device 10 may be unable to request deletion of account content (e.g., by deleting emails). Such limitations minimize the potential damage of unauthorized account access. For instance, an unauthorized user will not have the ability to change the password and lock the true accountholder out of the account.

Another form of enhanced security may comprise the use of multiple communication portals to enable access to an account or provide account access information. This security feature may be operated by the multiple security portal module 28.

Multiple security portal module 28 may communicate security-related user account information with providers 8, user devices 10, and identity verifiers 12. In some embodiments, multiple security portal module 28 may implement account verification procedures through one or more communication portals, e.g., in addition to the security implemented by login module 24.

For instance, a user 6 may attempt to login to a user account using device 10a over an unsecure network 16. The user's 6 security settings may require that login attempts over an unsecure network may be verified using one or more additional communication portals or access devices 10. Accordingly, security preferences module 26 may determine (e.g., based on the security settings stored in the security preferences database 56) that verification is to occur from one or more additional user devices 10b-n and/or portals or channels of communication. Based on this determination, multiple security portal module 28 may pass a security message to one or more additional access devices 10b-n according to the user's security settings for the account. For instance, the settings may specify that a verification message be sent via text message to a user's mobile phone 10b or to the user's PDA 10c. For instance, the access code may be sent via text message to a user's phone, or it may be sent to another user email address accessible from a PDA.

In some embodiments, the message may include a number or code that may be entered at a login screen (e.g., in conjunction with other security information such as username and password) to access the account. The code may expire after one or more uses.

In other embodiments, a response to such a message may be passed and confirmed before access is granted to the account. For instance, the user 6 may respond to the message by sending a responsive message (e.g., a confirmation message). Upon receipt of the verification message, the server 2 may enable access to the account. If a user 6 who did not attempt to login receives a verification message, the message may provide notice to the user 6 that there has been an attempt at unauthorized access. In this case, instead of sending a confirmation message, the user may send a "stop access" message that prevents access for the given login attempt.

Information about the failed login attempt may be sent to the user 6 (e.g., at a user access device 10) and stored by the server 2. In some conditions, the security settings may require a message to be sent to a one or more user devices 10.

In other embodiments, multiple security portal module 28 may grant account access based on receiving account access information from at least two different user access devices 10a, 10b. For instance, multiple security portal module 28 may receive a username and password from one device 10a such as a computer and then enable access to the account after receiving security information from at least one second user device 10b such as a user phone. In some of these embodiments, a security verification message may (or may not) be sent from the server 2 to the second user access device 10b.

In some embodiments, multiple security portal module 28 may enable access to an account upon receiving verification of the identity of the user 6, e.g., from third party identifiers 12, as described below.

It should be understood that any number of user access devices 10a-n may be used to verify access. For instance, security information may be passed and/or confirmed from three or more different access devices 10a-n before access is granted to an account. It should also be understood that access to the account may be granted to one or more of the user devices 10a-n, such as both a computer 10a and a mobile phone 10b.

Access Notification Module 36 may notify the user 6 each time access to an account is attempted or granted. For instance, access notification module 36 may send a message to user 6, user device 10, or identity verifier 12, or it may record the login activity on the account itself. This way, if a user 6 who did not recently login receives a message at a user device 10a that someone logged into the account (or discovers this information at the next login), the user may take immediate remedial action. In some embodiments, the user may send a message to the server 2 from the user device 10a blocking further access to the account.

Limited password module 30 may administer access to a user 6 account based on access information provided to access the account, such as a password. For instance, some user 6 accounts may have more than one associated username and/or password. Security settings for the account may associate certain account rights and privileges for each username and/or password. In this way, a user 6 may use the password granting full access only under ideal security conditions, such as at a home computer 10 with up-to-date anti-virus software and sophisticated firewall protection. For instance, accessing a user account with one password (e.g., "my_access_1") may grant a user a specific set of limited rights to the account (e.g., read-only access and email write access). Another password (e.g., "my_access_2") may grant read and write access to all documents and functions, while still another password (e.g., "my_access_FULL") may grant the user full administrative access to change security settings and account profile information.

Malware module 32 may inspect a user access device 10 (e.g., via cookies) and/or a communication network 16 to determine security information about the network 16 or access device 10. For instance, malware module 32 may inspect the registry of a user's computer 10 and compare the registry keys to a list of spyware and other malware stored in malware database 60. Based on this inspection, malware module 32 may determine if malware such as a keystroke detector is installed, or if other viruses and malware affect the user's computer 10. Malware module 32 may also determine the status of anti-virus software or other protective software of the user's computer, such as the quality of the software and the time of its last update. Based on such security conditions, malware module 32 may grant or deny limited access to the account. In some embodiments, malware module 32 may also alert the user 6 of any undesirable security conditions.

Malware module 32 may comprise a toolbar installed on a user access device 10. The toolbar may be associated with the network account; for instance, a single company may provide both the toolbar software and the network account. The toolbar may have software that communicates with server and/or the user's account. In some embodiments, malware module 32 may pass information to the server 2 regarding the security of the access device 10, such as the presence of malware. For instance, when a user accesses a web page associated with a user network account, such as a login page, malware module 32 may pass information to the server 2 regarding the security of the account.

In some embodiments, malware module 32 may enable a user to select a security setting from a toolbar or other software. For instance, user may click a button on the toolbar to request enhanced security of login or enhanced security (e.g., encryption) of data from a user's network account.

Identity verifier module 34 may communicate and process identity verification information, e.g., to verify the identity of a user 6 when a user 6 attempts to access an account. Identity verifier module 34 may comprise any processor or system capable of receiving and processing information received from users 6, such as an entity described above for third party verifiers 12. For instance, identity verifier module 34 may comprise a biometric scanner (e.g., fingerprint readers or retinal scanners). Identity verifier module 34 may also comprise an ATM terminal or other processor capable of communicating directly with a user 6. To obtain account verification data, identity verifier module 34 may communicate with third party verifiers 12 and user access devices 10, and it may also communicate directly with users 6.

In some embodiments identity verifier module 34 may comprise an REID reader to read an RFID associated with a user 6a (e.g., an RFID carried with or implanted on the user's 6a person). By comparing the authentication information with information stored in verifier database 54 (e.g., fingerprint data associated with the account to be accessed), identity verifier module 34 may determine whether the user 6a has permission to access the account (or to what extent the user 6a may access account information). The user 6a may be granted access to the account based on the determined identity of the user 6a and other verification information.

In other embodiments, a user 6a may specify one or more other users 6b-6n who may provide account access information (e.g., identity confirmation information). For instance, a specific user 6a may specify one or more specific other users 6b-6n who may authenticate the specific user's 6a login. When the user 6a attempts to access an account, information may be communicated with one or more other users 6b-6n to authenticate the user's 6a attempt, in any manner described herein. For instance, a message may be sent to another user's 6b device 10b, or an access code may be emailed to another user 6c which may be provided at the specific user's 6a login to access the user's 6a account (e.g., in conjunction with the user's 6a username and password). Security settings governing the communication with other users 6b-6n may be determined at account setup or a later date.

Identity verifier module 34 may also communicate with third party identity verifiers 12 to validate or authenticate a request to access an account. Thus, in some embodiments, a multiple portal verification may occur through verification from a third party identity verifier 12 (e.g., a third party individual or other entity) instead of (or in addition to) verification from one or more users 6 or devices 10.

For instance, a user 6 on a computer 10a at a computer lab may attempt to login to an account. The security preferences module 26 may specify that access may be granted to the account only if verified by the user's cell phone or an authorized third party. The server 2 may accordingly send a message to the computer 10a that account access is pending verification on a separate portal. There may be no cell phone reception in the computer lab, making it inconvenient or impossible to verify user 6 access. The message (or a follow-up message after a certain period of inaction) may indicate that the user may achieve account access through verification from a third party. Based on the IP address of the request or other circumstantial information, the identity verifier module 34 may identify that the computer lab administrator is a convenient authorized third party. Accordingly, the message may convey this information and identify the computer lab administrator as a potential identity verifier 12a. The message may also identify additional identity verifiers 12b-n and other portals of verification.

The computer lab administrator may accordingly verify the user's 6 identity (e.g., by checking picture ID). The computer lab administrator may then send an authentication message to server 2, e.g., via email, text message, or another means of communication. The authentication message may comprise an access code (e.g., an administrator password) and an identification of the user account in question (e.g., an identification of the user's 6 username). After receiving the authentication message from the identity verifier 12, the server 2 may grant the user 6 access (e.g., limited or full access) to the account. In some embodiments, instead of (or in addition to) sending the server 2 an authentication message, the identity verifier 12 may give the user 6 a code or password (e.g., a one-time use password) to access the account. The code may comprise a code received from the server 2, a one-time user password, or another code. The user 6 may then access the account directly without waiting for further action from the third party identifier 12.

Other module(s) 36 may accomplish other functions related to providing volume and history information.

A database 50 coupled to the server 2 may include one or more databases 50-66. The server 2 and its modules 20-36 may store and access information stored in the database(s) 50-66. Databases 52-66 may comprise portions of a single database 50. It should be appreciated that the databases 50-66 may or may not be physically distinct.

Account database 52 may store account information and content, such as security settings, passwords, emails, and other account information.

Login database 54 may store login information for each user 6 account, including username and password information. This information may be verified each time a user device 10 attempts to login to a user 6 account.

Security preferences database 56 may store security preference information, including any security preferences received from or determined by users 6, user devices 10, and security preference module 26. For instance, security preference database may store all security settings.

Security portal database 56 may store information about multiple security portals. For instance, it may store a list of communication portals that may be used to verify a user's 6 identity or communicate account information, such as a user's 6 mobile phone number for receiving text messages.

Limited password database 60 may store limited passwords usable to access limited user account information or to access an account a limited number of times, such as once.

Malware database 62 may store information related to spyware such as keystroke recorders, viruses, and other malware that may affect login and account security. For instance, malware database 62 may store identification information about any malware program.

Identity verifier database 64 may store information about identity verifiers 12, such as identification information, location information, contact information, and other information associated with the identity verifiers 12.

Other database(s) 54 may store other information relating to the network service providers 8, access devices 10, identity verifiers 12, server 2, account access information or content, security information, identity verification information, and other content.

Illustrative System Network Environment

FIG. 2 depicts a networked environment for operation of a system for verifying access to a network account according to an embodiment of the invention. In such an environment, identity verifiers 12 and providers 8 may connect over a network 14-16 to a server 2 (e.g., using a secure https connection) to communicate user account-related information to server 2 and to receive documents and rating request information from server 2. The server 2 may store user account information in a database 50. The server 2 may communicate account-related information (e.g., login pages and account content) through various forums or feeds, including direct distribution in print media, providing the documents on one or more web sites affiliated with the server 2 and through providers 8, or communicating via telephone, text messaging, or other means of communication. It should be noted that network service providers 8 and identity verifiers 12 may comprise syndication partners of the server 2 (e.g., connected over network 14 or 15 depending on security desired), content systems (e.g., with associated content databases) and search engine systems operated by the server 2 or provider(s) 8.

Through these various forums, the account-related information (e.g., documents associated with the account) provided to the providers 8 may be included in pages (or other documents) displayed to end-users 10.

For instance, a user device 10*c* may submit a request for user account information over networks 14, 15 and via network service provider 8*a* to server 2. Server 2 may pass security verification information over another communication network 16 (which may be another http or https network, phone network, or other network) to another device 10*a* of the user (e.g., vian identity verifier 12). The user device 10*a* may send a security confirmation back to the server 2, e.g., via network 16 or another network. Alternately or in addition, other user device 10*b*, 10*d*, or identity verifier 12 may send a security confirmation to the server 2.

Each of server 2, providers 8, and identity verifiers 12 may comprise computerized systems that include one or more of the following systems, for example: a web server 2, a database server 2, proxy server 2, network balancing mechanisms and systems, and various software components that enable the system to operate on the Internet or other network type system. Additionally, networks 14-16, although depicted as http networks, may comprise other networks such as private lines, telecommunications networks, intranets, or any other network. In an exemplary embodiment, the connection between an identity verifier 12 such as an advertisement provider and server 2 (and other connections such as between a provider 8 and server 2) may comprise secure network connections to insure that data is not subject to attack or corruption by any hacker or other third party. In addition, whereas two identity verifiers 12 are depicted, it should be appreciated that one or more identity verifiers 12 may be provided in the network.

Similarly, although one database 50 is depicted, it should be appreciated that multiple database 50 may be provided and that such database 50 may be connected to the server 2 via any type of network connection, including a distributed database server 2 architecture.

Similarly, provider 8*a* may comprise any number of such systems connected to the server 2 via any type of network, including an http or https network. Provider 8 may comprise a system such as server 2 that provides functionality for enabling connection over the Internet or other network protocols. Providers 8 may comprise any system that distributes content such as advertising to users 6.

Access devices 10 may comprise any communication device (such as devices connected to the Internet) and may comprise computerized systems that enable that connection through any of various types of networks, including through Internet service providers, cable companies, and any other method of accessing data on the Internet.

Illustrative Process

Figure 3:
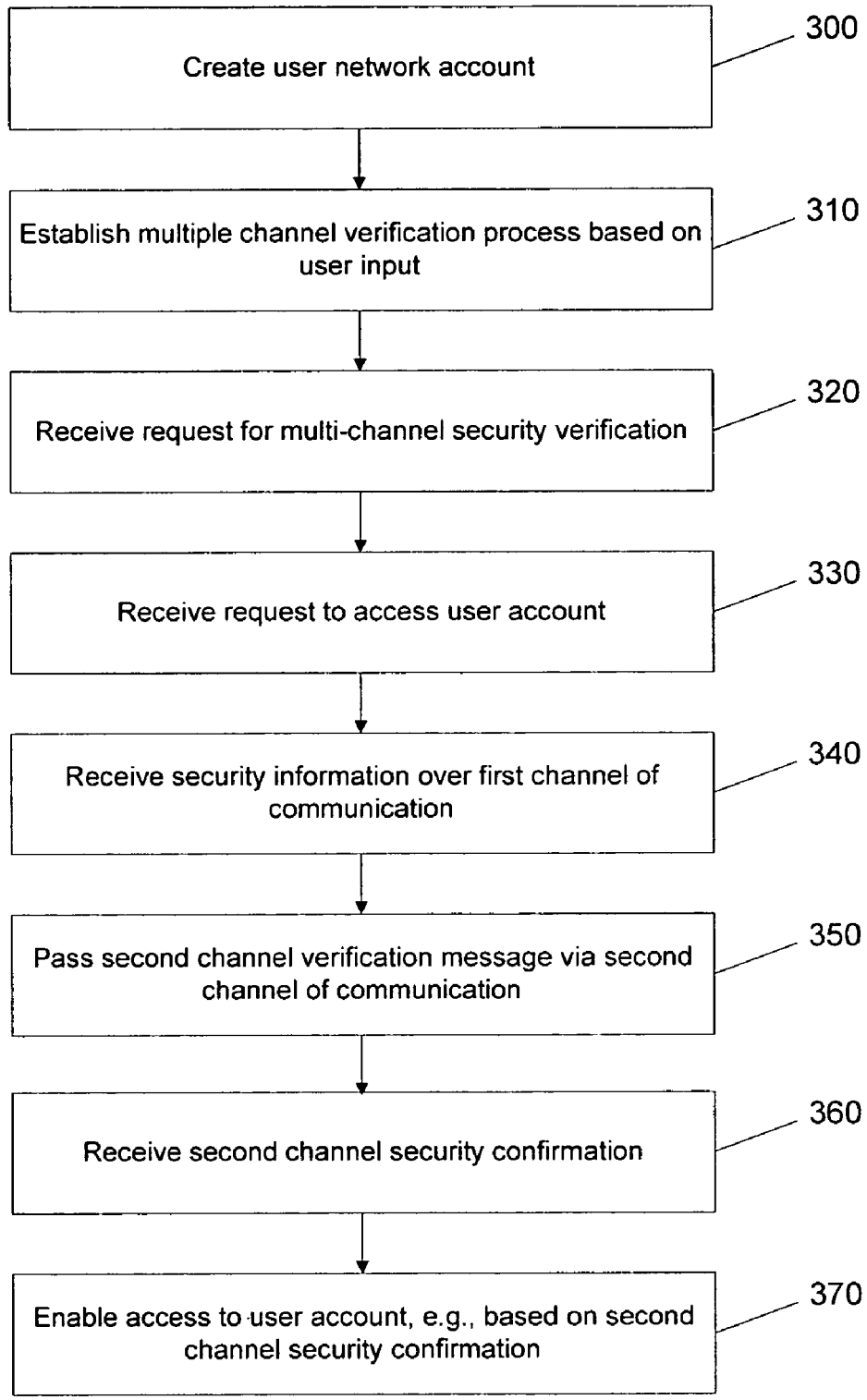
FIG. 3 depicts a flow chart illustrating an exemplary method for verifying access to a network account according to an embodiment of the invention.

FIG. 3 depicts a flow chart illustrating an exemplary method for verifying access to a network account according to an embodiment of the invention. The methods described herein may be implemented by the systems described in FIGS. 1 and 2.

In block 300, a network account may be created. For instance, a user may request a network account such as an email account and provide account information, such as a name, username, password, address, and other information.

In block 310, a second portal verification process may be established based on user input. Account security preferences may be determined, e.g., when the account is created or at a later time, such as when the user subsequently logs into an account.

For instance, the user may request to receive an access code via text message on the user's mobile phone when the user logs into an account. By entering the text message access code at the login screen, the user may acquire access to the account.

In block 320, a request for multi-portal security verification may be received. For instance, the user may request to have additional verification in certain circumstances (beyond traditional username and password authentication), such as verification over an additional verification portal or channel of communication. For instance, the user may request the server to block access to the account unless a security code received via text message at a second user portal is entered (e.g., in addition to a username and password) in circumstances where access to the account is attempted more than 10 times in a 24 hour period.

In block 330, a request to access a user account may be received. For instance, the user may attempt to login to the account. This attempt to login may occur under circumstances that require at least one second portal of verification according to the security settings of the account. For instance, the user may attempt to login eleven times in a single 24 hour period, wherein the eleventh login triggers the multiple portal security requirements.

In block 340, first security information may be received over one communications portal. For instance, the user may enter a traditional username and password such as "johndoe1" and "ckwabfg," respectively, at a user computer terminal.

In block 350, a second portal security message may be passed via a second channel of communication to a second portal. For instance, the server 2 may send a text message comprising a one-time use account access code that may be used in conjunction with the username and password to access the account.

In block 360, second portal security information may be received, e.g., from a user. For instance, the user may enter the one-time use access code (e.g., on a login screen together with a username and password) and submit the information to the account provider server.

In block 370, access to the user account may be enabled. The server may enable grant the user limited or full access to account information and functionalities. The extent of access may also depend on predetermined security settings. For instance, if the user is traveling for a month, the user may specify that access to the user profile (e.g., where a password may be changed) may not be granted for that month.

Illustrative User Interface and Results

FIG. 4 depicts an exemplary user security settings interface 400 according to an embodiment of the invention. The interface 400 displays user profile settings including security preferences. Here, the user 6 has selected, among other security preferences, that a second portal of user identity verification (in addition to standard username and password) will be passed and/or confirmed whenever the user 6 logs in from a computer with identified malware or from any IP address determined to be in Romania. In such circumstances, the user 6 has requested that the server 2 send a security access code via text message to the user's 6 mobile phone 10 having phone number (202 555-1234). This user has also chosen to disable the ability of third party identity verifiers 12 to grant access to the account. In some embodiments, these preferences may be selectable or changeable by the user 6.

Figure 5:
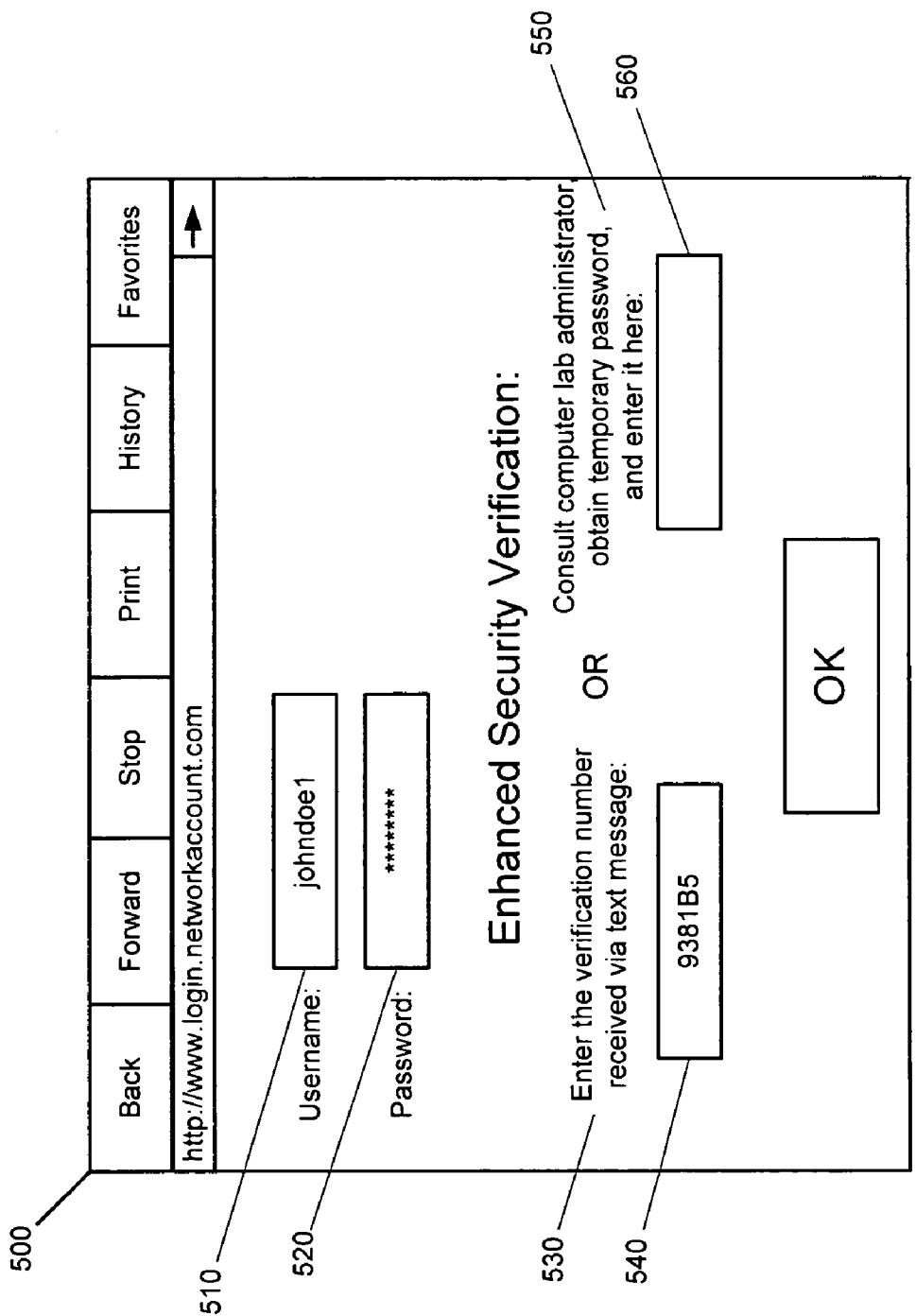
FIG. 5 depicts an exemplary login interface according to an embodiment of the invention.

FIG. 5 depicts an exemplary login interface page 500 according to an embodiment of the invention. The login interface 500 may comprise a username prompt 510, password prompt 520, second portal security message 530, second portal security code prompt 540, identity verifier message 550, and third party verification code prompt 560. This page 500 may be displayed when a user 6 attempts to access a user account in conditions that require at least one second verification portal. For instance, the user 6 who is traveling may require that all subsequent logins require additional verification, or the user may be logging in from an unsecure computer 10 that triggers second portal verification according to the user's security preference settings.

As shown in FIG. 5, the user has already entered a username ("johndoe1") and password (indicated by asterisks) at the appropriate prompts 510, 520. The user has also entered a second portal verification code ("9381B5") in second verification prompt 540. In this case, the user may have received the text message "9381B5" from server 2. By entering this code and passing it to the server 2 (e.g., by clicking "OK"), the user 6 may be granted access to the account by the server 2. In some embodiments, the account access may be limited, depending on the account security profile.

It should be understood that the server 2, processors, and modules described herein may perform their functions (e.g., reading optical information or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to email accounts, the principles herein are equally applicable to other network accounts, such as online financial accounts, user accounts with etailers, and other accounts having account information accessible via a network and some level of security. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method for verifying authorization of access to a network account, comprising:
   at a server associated with a user network account:
      associating a first user communication portal with the user network account;
      receiving an access request to access the user network account from a second user communication portal;
      in response to the access request: determining security criteria related to the second user communication portal; and passing a security verification request to the first user communication portal when the security criteria is of a predetermined value, wherein the security verification request includes a request for a user of the first user communication portal to decide whether to verify authorization of access to the user network account via the second user communication portal;
      receiving a communication from the first user communication portal in response to the security verification request, wherein the communication includes information indicative of a user response to the security verification request;
      performing an account access operation enabling access to the user network account from the second communication portal based on the user response to the security verification request; and
      wherein the first and second user communication portals comprise devices distinct from the server.

2. The method of claim 1, wherein the determining action is based on the location of the second user communication portal.

3. The method of claim 1, wherein the determining action is based on a determination that the second user communication portal is not secure.

4. The method of claim 1, wherein the determining action is based on a determination by a program operative at the second user communication portal that spyware or malware is present at the second user communication portal.

5. The method of claim 1, wherein the determining action is based on the number of times a request to access the account has been received in a predetermined period of time.

6. The method of claim 1, wherein the determining action is triggered based on an account setting selected by a user associated with the user network account.

7. The method of claim 1, wherein the access request comprises a request to use additional security measures to verify authorization of access to the user network account.

8. The method of claim 1, further comprising:
receiving an enhanced security account access identifier, wherein the determining action is based on the enhanced security account access identifier.

9. The method of claim 1, wherein the act of passing a security verification request to the first user communication portal comprises passing a text message to at least one of a user's mobile phone, a user's PDA, and a user's portable wireless gaming device.

10. The method of claim 1, wherein the account access operation includes conditionally enabling access to the user network account upon receipt of the user response from the first user communication portal in accordance with the content of the user response.

11. The method of claim 10, wherein the communication comprises an account access code; and wherein the act of enabling access to the network account occurs after receiving a username and a password associated with the user network account and the account access code.

12. The method of claim 1, wherein the access request comprises at least one of an account ID and a password.

13. The method of claim 1, wherein the first user communication portal is identified by at least one of a user telecommunications account, a user portable gaming system account, and a user email account.

14. The method of claim 1, wherein the user network account may be accessed over the Internet and comprises at least one of an email account, a bank account, and a user account with a merchant.

15. The method of claim 1, wherein the account access operation further comprises enabling access to the user network account from the first user communication portal based on the user response to the security verification request.

16. The method of claim 1, wherein the second user communication portal comprises a computer terminal.

17. The method of claim 1, wherein the first user communication portal and the user network account are associated with a first user, and wherein the second user communication portal is associated with a second user.

18. The method of claim 1 wherein the account access operation is based at least in part on the determined security criteria.

19. The method of claim 1, wherein the access request includes information indicating that the access request is for limited access; and
wherein the account access operation includes enabling limited access to the user network account upon receipt of the user response from the first user communication portal.

20. A server for verifying access to a network account, comprising:
at least one processor;
an associating module that associates a first user communication portal with a user network account;
a request receiving module that receives an access request to access the user network account from a second user communication portal;
a security determination module that determines security criteria related to the second user communication portal;
a communication module that passes a security verification request to the first user communication portal when the security criteria is of a predetermined value, wherein the security verification request includes a request for a user of the first user communication portal to decide whether to verify authorization of access to the user network account via the second user communication portal;
an account access module that receives a communication from the first user communication portal in response to the security verification request, wherein the communication includes information indicative of a user response to the security verification request, and performs an account access operation enabling access to the user network account from the second communication portal based on the user response to the security verification request; and
wherein the first and second user communication portals comprise devices distinct from the server.

21. The server of claim 20, wherein the server determines the security criteria based on the location of the second user communication portal.

22. The server of claim 20, wherein the server determines the security criteria based on a determination that the second user communication portal is not secure.

23. The server of claim 20, wherein the server determines the security criteria based on a determination by a program operative at the second user communication portal that spyware or malware is present at the second user communication portal.

24. The server of claim 20, wherein the server determines the security criteria based on the number of times a request to access the account has been received in a predetermined period of time.

25. The server of claim 20, wherein determining the security criteria is triggered based on an account setting selected by a user associated with the user network account.

26. The server of claim 20, wherein the access request comprises a request to use additional security measures to verify authorization of access to the user network account.

27. The server of claim 20, wherein:
the access request includes an enhanced security account access identifier; and
the server determines the security criteria based on the enhanced security account access identifier.

28. The server of claim 20, wherein passing the security verification request to the first user communication portal comprises passing a text message to at least one of a user's mobile phone, a user's PDA, and a user's portable wireless gaming device.

29. The server of claim 20, wherein performing the account access operation includes conditionally enabling access to the user network account upon receipt of the user response from the first user communication portal in accordance with the content of the user response.

30. The server of claim 29, wherein:
the communication comprises an account access code; and
access to the network account is enabled after receiving a username and a password associated with the user network account and the account access code.

31. The server of claim 20, wherein performing the account access operation includes enabling access to the user network account from the first user communication portal based on the user response to the security verification request.

32. The server of claim 20, wherein the access request comprises at least one of an account ID and a password.

33. The server of claim 20, wherein the first user communication portal is identified by at least one of a user telecommunications account, a user portable gaming system account, and a user email account.

34. The server of claim 20, wherein the user network account may be accessed over the Internet and comprises at least one of an email account, a bank account, and a user account with a merchant.

35. The server of claim 20, wherein the second user communication portal comprises a computer terminal.

36. The server of claim 20, wherein:
the first user communication portal and the user network account are associated with a first user; and
the second user communication portal is associated with a second user.

37. The server of claim 20 wherein the server performs the account access operation based at least in part on the determined security criteria.

38. The server of claim 20, wherein:
the access request includes information indicating that the access request is for limited access; and
performing the account access operation includes enabling limited access to the user network account upon receipt of the user response from the first user communication portal.

39. A computer-implemented method for verifying access to a network account, comprising:
at a server associated with a user network account:
associating a user telecommunications number with the user network account;
receiving an access request to access the user network account from a computer;
determining security criteria related to the computer, wherein the security criteria comprises information about at least one of a location of the computer and a presence of spyware or malware at the computer;
based on the security criteria, requesting a confirmation from a device associated with the user telecommunications number, wherein requesting a confirmation includes a request for a user of the device to decide whether to verify authorization of access to the user network account via the computer;
receiving the confirmation from the device associated with the user telecommunications number, wherein the confirmation includes information indicative of a user response to the request for a confirmation;
enabling access to the user network account at the computer based on receiving the user response to the request for confirmation; and
wherein the device and the computer are distinct from the server.

40. A server for verifying access to a network account, comprising:
at least one processor;
an associating module that associates a user telecommunications number with a user network account;
a request receiving module that receives an access request to access the user network account from a computer;
a security determination module that determines security criteria related to the computer, wherein the security criteria comprises information about at least one of a location of the computer and a presence of spyware or malware at the computer;
an identity verifier module that passes a confirmation request to a device associated with the user telecommunications number based on the security criteria, wherein the confirmation request includes a request for a user of the device to decide whether to verify authorization of access to the user network account via the computer;
a multiple security portal module that receives a confirmation from the device associated with the user telecommunications number, wherein the confirmation includes information indicative of a user response to the request for a confirmation; and enables access to the user network account at the computer based on receiving the user response to the confirmation request; and
wherein the device and the computer are distinct from the server.

* * * * *